United States Patent
Tachiki et al.

(10) Patent No.: US 10,577,705 B2
(45) Date of Patent: *Mar. 3, 2020

(54) STEEL SHEET FOR CONTAINER AND METHOD FOR PRODUCING STEEL SHEET FOR CONTAINER

(71) Applicant: NIPPON STEEL CORPORATION, Tokyo (JP)

(72) Inventors: Akira Tachiki, Kitakyushu (JP); Shigeru Hirano, Kitakyushu (JP); Yoshiaki Tani, Kitakyushu (JP); Hirokazu Yokoya, Onga-gun (JP); Morio Yanagihara, Wuhan (CN); Makoto Kawabata, Chonburi (TH)

(73) Assignee: NIPPON STEEL CORPORATION, Tokyo (JP)

( * ) Notice: Subject to any disclaimer, the term of this patent is extended or adjusted under 35 U.S.C. 154(b) by 191 days.

This patent is subject to a terminal disclaimer.

(21) Appl. No.: 15/563,208

(22) PCT Filed: Apr. 15, 2016

(86) PCT No.: PCT/JP2016/062146
§ 371 (c)(1),
(2) Date: Sep. 29, 2017

(87) PCT Pub. No.: WO2016/167357
PCT Pub. Date: Oct. 20, 2016

(65) Prior Publication Data
US 2018/0087172 A1    Mar. 29, 2018

(30) Foreign Application Priority Data

Apr. 16, 2015  (JP) ................. 2015-083985
Apr. 16, 2015  (JP) ................. 2015-083986

(51) Int. Cl.
*C25D 5/12*  (2006.01)
*C25D 5/50*  (2006.01)
(Continued)

(52) U.S. Cl.
CPC ............... *C25D 5/12* (2013.01); *B32B 15/01* (2013.01); *B32B 15/013* (2013.01);
(Continued)

(58) Field of Classification Search
CPC ......... C25D 11/00; C25D 11/36; C25D 11/34; C25D 11/02; C25D 11/26; C25D 7/0614;
(Continued)

(56) References Cited

U.S. PATENT DOCUMENTS

2004/0244874 A1  12/2004  Nakayama et al.
2011/0300402 A1  12/2011  Tachiki et al.
(Continued)

FOREIGN PATENT DOCUMENTS

CN  1516751 A  7/2004
EP  2143822 A1  1/2010
(Continued)

OTHER PUBLICATIONS

Machine Translation, Yasuda et al., JP 2005-325401, Nov. 2005. (Year: 2005).*
(Continued)

*Primary Examiner* — Michael E. La Villa
(74) *Attorney, Agent, or Firm* — Birch, Stewart, Kolasch & Birch, LLP

(57) ABSTRACT

A steel sheet for a container includes: a steel sheet; a coated layer containing Ni provided as an upper layer of the steel sheet; and a chemical treatment layer as an upper layer of the coated layer, and containing a Zr compound in an amount of 3.0 to 30.0 mg/m² in terms of Zr metal, and a Mg compound in an amount of 0.50 to 5.00 mg/m² in terms of Mg metal,
(Continued)

in which the coated layer is one of: a Ni coated layer which contains Ni in amount of 10 to 1000 mg/m$^2$ in terms of Ni metal, and a composite coated layer which contains Ni in an amount of 5 to 150 mg/m$^2$ in terms of Ni metal and Sn in an amount of 300 to 3000 mg/m$^2$ in terms of Sn metal, and has an island-shaped Sn coated layer formed on an Fe—Ni—Sn alloy layer.

9 Claims, 1 Drawing Sheet

(51) Int. Cl.

| | | |
|---|---|---|
| C25D 9/08 | (2006.01) | |
| C25D 7/06 | (2006.01) | |
| B32B 15/01 | (2006.01) | |
| C25D 5/48 | (2006.01) | |
| C23C 28/00 | (2006.01) | |
| C23C 30/00 | (2006.01) | |
| C23C 28/02 | (2006.01) | |
| C23C 10/28 | (2006.01) | |
| C23C 2/02 | (2006.01) | |
| C23C 2/28 | (2006.01) | |
| C23C 2/40 | (2006.01) | |
| C23C 2/08 | (2006.01) | |
| C23C 10/02 | (2006.01) | |
| C25D 11/36 | (2006.01) | |
| C25D 5/34 | (2006.01) | |
| C25D 5/40 | (2006.01) | |
| C25D 11/00 | (2006.01) | |
| C25D 7/04 | (2006.01) | |
| C25D 5/36 | (2006.01) | |
| C25D 11/34 | (2006.01) | |
| C25D 11/26 | (2006.01) | |
| C25D 9/10 | (2006.01) | |
| C25D 11/02 | (2006.01) | |
| B32B 15/18 | (2006.01) | |
| B32B 15/04 | (2006.01) | |
| C23C 2/26 | (2006.01) | |
| C23C 2/04 | (2006.01) | |
| C23C 2/34 | (2006.01) | |

(52) U.S. Cl.
CPC ............ *B32B 15/015* (2013.01); *B32B 15/04* (2013.01); *B32B 15/043* (2013.01); *B32B 15/18* (2013.01); *C23C 2/02* (2013.01); *C23C 2/04* (2013.01); *C23C 2/08* (2013.01); *C23C 2/26* (2013.01); *C23C 2/28* (2013.01); *C23C 2/285* (2013.01); *C23C 2/34* (2013.01); *C23C 2/40* (2013.01); *C23C 10/02* (2013.01); *C23C 10/28* (2013.01); *C23C 28/00* (2013.01); *C23C 28/023* (2013.01); *C23C 28/30* (2013.01); *C23C 28/32* (2013.01); *C23C 28/321* (2013.01); *C23C 28/322* (2013.01); *C23C 28/34* (2013.01); *C23C 28/345* (2013.01); *C23C 30/00* (2013.01); *C23C 30/005* (2013.01); *C25D 5/34* (2013.01); *C25D 5/36* (2013.01); *C25D 5/40* (2013.01); *C25D 5/48* (2013.01); *C25D 5/50* (2013.01); *C25D 5/505* (2013.01); *C25D 7/04* (2013.01); *C25D 7/06* (2013.01); *C25D 7/0614* (2013.01); *C25D 9/08* (2013.01); *C25D 9/10* (2013.01); *C25D 11/00* (2013.01); *C25D 11/02* (2013.01); *C25D 11/26* (2013.01); *C25D 11/34* (2013.01); *C25D 11/36* (2013.01); *B32B 2250/03* (2013.01); *B32B 2255/06* (2013.01); *B32B 2255/205* (2013.01); *B32B 2255/28* (2013.01); *B32B 2439/70* (2013.01); *Y10T 428/1266* (2015.01); *Y10T 428/12611* (2015.01); *Y10T 428/12618* (2015.01); *Y10T 428/12667* (2015.01); *Y10T 428/12708* (2015.01); *Y10T 428/12715* (2015.01); *Y10T 428/12722* (2015.01); *Y10T 428/12931* (2015.01); *Y10T 428/12937* (2015.01); *Y10T 428/12944* (2015.01); *Y10T 428/12951* (2015.01); *Y10T 428/12972* (2015.01); *Y10T 428/12986* (2015.01); *Y10T 428/2495* (2015.01); *Y10T 428/24942* (2015.01); *Y10T 428/263* (2015.01); *Y10T 428/264* (2015.01); *Y10T 428/265* (2015.01); *Y10T 428/27* (2015.01)

(58) Field of Classification Search
CPC ... C25D 7/04; C25D 7/06; C25D 5/50; C25D 5/505; C25D 5/12; C25D 5/48; C25D 5/36; C25D 5/40; C25D 5/34; C25D 9/08; C25D 9/04; C25D 9/10; C23C 10/28; C23C 10/02; C23C 30/00; C23C 30/005; C23C 28/023; C23C 28/321; C23C 28/34; C23C 28/00; C23C 28/30; C23C 28/32; C23C 28/322; C23C 28/345; C23C 2/02; C23C 2/08; C23C 2/28; C23C 2/40; C23C 2/04; C23C 2/26; C23C 2/285; C23C 2/34; B32B 15/01; B32B 15/015; B32B 15/013; B32B 15/04; B32B 15/043; B32B 15/18; B32B 2439/70; B32B 2255/28; B32B 2255/06; B32B 2255/205; B32B 2250/03; Y10T 428/12708; Y10T 428/12715; Y10T 428/12722; Y10T 428/12931; Y10T 428/12937; Y10T 428/12944; Y10T 428/12951; Y10T 428/12972; Y10T 428/12986; Y10T 428/12611; Y10T 428/12618; Y10T 428/1266; Y10T 428/12667; Y10T 428/24942; Y10T 428/2495; Y10T 428/27; Y10T 428/263; Y10T 428/264; Y10T 428/265
See application file for complete search history.

(56) References Cited

U.S. PATENT DOCUMENTS

| | | |
|---|---|---|
| 2012/0064369 A1 | 3/2012 | Tachiki et al. |
| 2013/0034745 A1 | 2/2013 | Tachiki et al. |
| 2013/0216714 A1 | 8/2013 | Suzuki et al. |
| 2016/0289843 A1 | 10/2016 | Kurokawa et al. |

FOREIGN PATENT DOCUMENTS

| | | |
|---|---|---|
| EP | 2589685 A1 | 5/2013 |
| EP | 3000917 A1 | 3/2016 |
| JP | 54-68734 A | 6/1979 |
| JP | 2000-239855 A | 9/2000 |
| JP | 2003-171778 A | 6/2003 |
| JP | 2005-23422 A | 1/2005 |
| JP | 2005-325401 A | 11/2005 |
| JP | 2005-325402 A | 11/2005 |
| JP | 2006-336106 A | 12/2006 |
| JP | 2008-50641 A | 3/2008 |
| JP | 2009-1851 A | 1/2009 |
| JP | 2009-84623 A | 4/2009 |
| JP | 2012-62521 A | 3/2012 |
| JP | 2013-237922 A | 11/2013 |
| JP | 2006-9047 A | 1/2016 |
| TW | 201223752 A1 | 6/2012 |
| WO | WO 2010/140711 A1 | 12/2010 |

(56) References Cited

FOREIGN PATENT DOCUMENTS

| WO | WO 2011/118588 A1 | 9/2011 |
| WO | WO 2014/189081 A1 | 11/2014 |
| WO | WO 2015/093318 A1 | 6/2015 |

OTHER PUBLICATIONS

Extended European Search Report, dated Aug. 21, 2018, for corresponding European Application No. 16780148.9.
International Search Report for PCT/JP2016/062146 dated Jul. 12, 2016.
Liu et al., "The Effect of Magnesium Ions in Phosphate Coatings on Hot-dip Galvanized Steels", Journal of Chinese Corrosion Engineering, vol. 24, No. 2, Jan. 18, 2010, pp. 77-82.
Office Action for TW 105111826 dated Dec. 30, 2016.
Written Opinion of the International Searching Authority for PCT/JP2016/062146 (PCT/ISA/237) dated Jul. 12, 2016.
Extended European Search Report, dated Jul. 20, 2018, for European Application No. 16780134.9.
International Search Report for PCT/JP2016/062103 dated Jun. 7, 2016.
Office Action for TW 105111828 dated Dec. 12, 2016.
U.S. Office Action for U.S. Appl. No. 15/562,805, dated Jun. 27, 2019.
Written Opinion of the International Searching Authority for PCT/JP2016/062103 (PCT/ISA/237) dated Jun. 7, 2016.
U.S. Appl. No. 15/562,805, filed Sep. 28, 2017.

\* cited by examiner

STEEL SHEET FOR CONTAINER AND METHOD FOR PRODUCING STEEL SHEET FOR CONTAINER

TECHNICAL FIELD OF THE INVENTION

The present invention relates to a steel sheet for a container and a method for producing the steel sheet for a container.

Priority is claimed on Japanese Patent Application No. 2015-83985 filed on Apr. 16, 2015, and Japanese Patent Application No. 2015-83986 filed on Apr. 16, 2015, the content of which is incorporated herein by reference.

RELATED ART

As a container for beverage or food, a metal container obtained by performing can making to a coated steel sheet such as a Ni coated steel sheet, a Sn coated steel sheet or a Sn-based alloy-coated steel sheet is often used. Before or after the can making, a lacquer may be applied onto the surface of such a metal container, or a film may be laminated on the surface of the metal container. A lacquer and a film used in surface treatment of a metal container are collectively referred to as a coating agent.

A coated steel sheet used for a substrate of the coating agent may be subjected to surface treatment (referred to as chromate treatment below) using a hexavalent chromate and the like is used for ensuring corrosion resistance and adhesion to the coating agent, in many cases (for example, see the following Patent Document 1). Further, in order to impart organic-solvent resistance, fingerprint-proof properties, scratch resistance, lubricity, and the like, if necessary, a coating layer constructed of an organic resin is formed on the film formed by the chromate treatment of the chromate-treated coated steel sheet.

However, since hexavalent chromium used in the chromate treatment is environmentally harmful, recently, there is a move to replace surface treatment of a coated steel sheet from the chromate treatment to another surface treatment.

For example, the following Patent Document 2 and Patent Document 3 disclose cathode electrolysis treatment using a chemical treatment solution which includes Zr ions and F ions, as surface treatment of a coated steel sheet for replacing the chromate treatment.

The following Patent Document 4 discloses cathode electrolysis treatment using a chemical treatment solution which includes phosphate ions and one or more of Ti ions and Zr ions.

The following Patent Document 5 discloses cathode electrolysis treatment using a chemical treatment solution which includes Zr ions, F ions, and phosphate ions.

The following Patent Document 6 discloses cathode electrolysis treatment using a chemical treatment solution which includes Zr ions and an organic matter.

The following Patent Document 7 discloses cathode electrolysis treatment using a chemical treatment solution which includes Zr ions, phosphate ions, and an organic matter.

The following Patent Document 8 and Patent Document 9 disclose cathode electrolysis treatment using a chemical treatment solution which includes Zr ions, phosphate ions, and nitrate ions. In particular, the following Patent Document 9 discloses a method of increasing the number of nitrate ions so as to accelerate formation of a film (referred to as a chemical treatment layer below) formed by cathode electrolysis treatment.

PRIOR ART DOCUMENT

Patent Document

[Patent Document 1] Japanese Unexamined Patent Application, First Publication No. 2000-239855
[Patent Document 2] Japanese Unexamined Patent Application, First Publication No. 2005-325402
[Patent Document 3] Japanese Unexamined Patent Application, First Publication No. 2005-23422
[Patent Document 4] Japanese Unexamined Patent Application, First Publication No. S54-68734
[Patent Document 5] Japanese Unexamined Patent Application, First Publication No. 2006-9047
[Patent Document 6] Japanese Unexamined Patent Application, First Publication No. 2008-50641
[Patent Document 7] Japanese Unexamined Patent Application, First Publication No. 2009-1851
[Patent Document 8] Japanese Unexamined Patent Application, First Publication No. 2009-84623
[Patent Document 9] PCT International Publication No. WO2011/118588

DISCLOSURE OF THE INVENTION

Problems to be Solved by the Invention

However, in the technologies disclosed in Patent Document 2 to Patent Document 8, a long period is required for forming a chemical treatment layer which contains a Zr compound. Thus, there is a problem in that suitable productivity is not obtained. There is a problem in that nitrate ions having high concentration are required for forming a chemical treatment layer using the technology disclosed in Patent Document 9 for a short period, and this is not preferable in an environment.

A steel sheet for a container, which is used in a container for food is required to have sulphide stain resistance. However, in Patent Document 2 to Patent Document 9, a method of improving sulphide stain resistance is not disclosed.

For example, in a case where a steel sheet for a container is used in a container for food, which has high-protein food such as fish meat or beans, as contents, the color of the inner surface of the container or the content, or a combination thereof may be discolored to be black by retort treatment (high-temperature heating sterilization treatment under existence of water vapor) after filling with food. Such a blackening phenomenon is referred to as sulphide stain.

Sulfur (S) in food is thermally decomposed by retort treatment, and thus hydrogen sulphide ($H_2S$), thiols ($HS^-$), and the like are generated. The hydrogen sulphide and thiols cause to react with constituent metal in the inner surface of a container, and black metal sulphide is generated. Thus, sulphide stain occurs.

The appearance of the container may be deteriorated due to the sulphide stain. Further, a consumer may mistake the generated black metal sulphide for metal corrosion of the inner surface of the container or for spoiling of the contents. Thus, particularly, in a steel sheet for a container, which is used in a container for food, it is necessary that sulphide stain does not occur as much as possible.

An object of the present invention is to provide a steel sheet for a container and a method for producing the steel sheet for a container, which have excellent productivity, environmental properties, and sulphide stain resistance.

Means for Solving the Problem

To solve the above problems and achieve the object, the present invention employs the following units.

(1) A steel sheet for a container according to one embodiment of the present invention includes: a steel sheet; a coated layer which contains Ni and is provided as an upper layer of the steel sheet; and a chemical treatment layer which is provided as an upper layer of the coated layer, and contains a Zr compound in an amount of 3.0 to 30.0 mg/m$^2$ in terms of Zr metal, and a Mg compound in an amount of 0.50 to 5.00 mg/m$^2$ in terms of Mg metal, in which the coated layer is one of the group consisting of a Ni coated layer which contains Ni in amount of 10 to 1000 mg/m$^2$ in terms of Ni metal, and a composite coated layer which contains Ni in an amount of 5 to 150 mg/m$^2$ in terms of Ni metal and Sn in an amount of 300 to 3000 mg/m$^2$ in terms of Sn metal, and has an island-shaped Sn coated layer formed on an Fe—Ni—Sn alloy layer.

(2) In the steel sheet for a container according (1), the chemical treatment layer may further contain one or more selected from the group consisting of phosphoric acid and phosphate in a total amount of 1.5 to 25.0 mg/m$^2$ in terms of P.

(3) A method for producing a steel sheet for a container according to one embodiment of the present invention includes: coating so as to form a Ni coated layer which contains Ni in amount of 10 to 1000 mg/m$^2$ in terms of Ni metal, or a composite coated layer which contains Ni in an amount of 5 to 150 mg/m$^2$ in terms of Ni metal and Sn in an amount of 300 to 3000 mg/m$^2$ in terms of Sn metal, and has an island-shaped Sn coated layer and an Fe—Ni—Sn alloy layer formed on the island-shaped Sn coated layer, on a steel sheet; after the coating, chemical treating so as to form a chemical treatment layer on the coated layer by cathode electrolysis treatment using a chemical treatment solution containing 100 to 3000 ppm of Zr ions, 120 to 4000 ppm of F ions, and 50 to 300 ppm of Mg ions; and after the chemical treating, main-washing the steel sheet on which the coated layer and the chemical treatment layer are formed, using water at a temperature of 40° C. or higher for 0.5 seconds or longer.

(4) In the method for producing a steel sheet for a container according to (3), the chemical treatment solution may further include 2000 ppm or less of phosphate ions.

(5) In the method for producing a steel sheet for a container according to (3) or (4), the chemical treatment solution may further include nitrate ions and ammonium ions having a total amount of 20000 ppm or less.

(6) The method for producing a steel sheet for a container according to any one of (3) to (5) may further includes: before the main-washing, preliminary-washing the steel sheet on which the Sn coated layer and the chemical treatment layer are formed, using water at a temperature of 10° C. or more and lower than 40° C. for 0.5 seconds or longer.

Effects of the Invention

According to the aspects, it is possible to provide a steel sheet for a container and a method for producing the steel sheet for a container, which have excellent productivity, environmental properties, and sulphide stain resistance.

EMBODIMENTS OF THE INVENTION

Hereinafter, a steel sheet for a container and a method for producing the steel sheet for a container according to an embodiment will be described with reference to the drawings.

(Steel Sheet for a Container)

Firstly, a steel sheet for a container 10 will be described.

Figure 1:
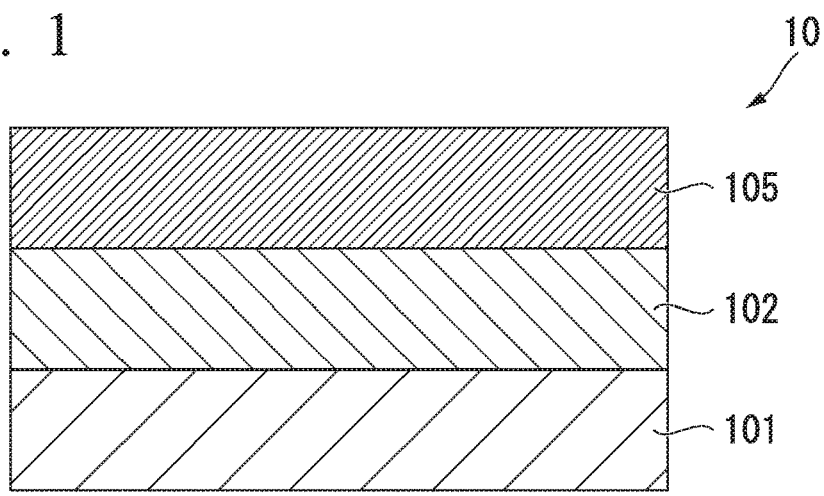
FIG. 1 is a schematic diagram showing a configuration of a steel sheet for a container according to an embodiment.
Figure 2:
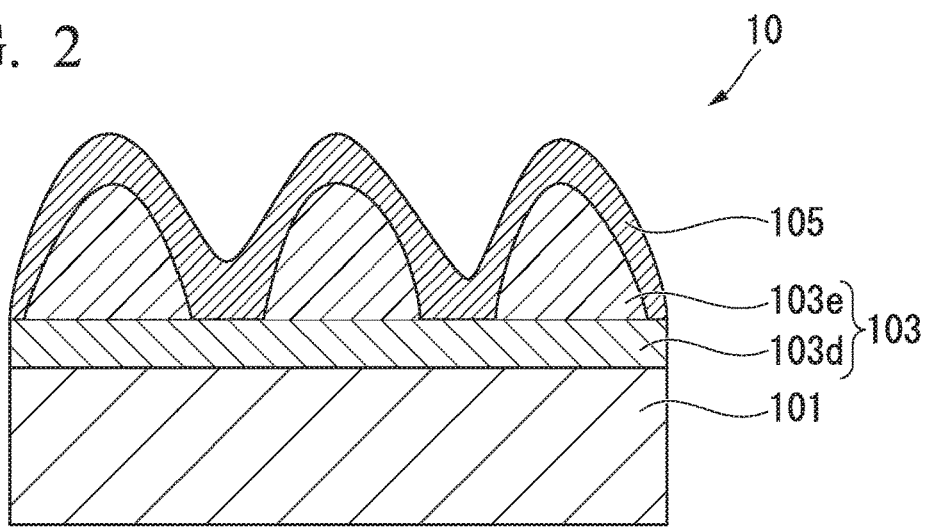
FIG. 2 is a schematic diagram showing the configuration of the steel sheet for a container according to the embodiment.

FIGS. 1 and 2 are schematic diagrams showing a configuration of the steel sheet for a container 10 according to the embodiment. As shown in FIGS. 1 and 2, the steel sheet for a container 10 includes a steel sheet (original plate) 101 used as base material, a coated layer which is either of a Ni coated layer 102 and a composite coated layer 103 which are formed on the steel sheet 101, and a chemical treatment layer 105 formed on the coated layer.

The steel sheet 101 is not particularly limited. Generally, known steel sheets 101 used as a steel sheet for a container may be used. A method for producing known steel sheets 101, a material, and the like of the known steel sheets 101 are also not particularly limited. A steel sheet 101 produced by processes from a general steel piece producing process through known processes such as hot rolling, pickling, cold rolling, annealing, and temper rolling may be used.

In the steel sheet for a container 10, a coated layer, which is either of the Ni coated layer 102 and the composite coated layer 103, is formed as an upper layer of the steel sheet 101.

An example of the Ni coated layer 102 and the composite coated layer 103 will be specifically described below with reference to FIGS. 1 and 2.

[Case where Ni Coated Layer 102 is Formed on Surface of Steel Sheet 101]

A case where the Ni coated layer 102 is formed on the surface of the steel sheet 101 will be described with reference to FIG. 1.

The Ni coated layer 102 contains Ni in amount of 10 to 1000 mg/m$^2$ in terms of Ni metal per one side.

Ni has excellent lacquer adhesion, film adhesion, corrosion resistance, and weldability. In order to exhibit the above-described effect, the Ni coated layer 102 is required to contain Ni in an amount of 10 mg/m$^2$ or more in terms of Ni metal per one side. The above-described effect is improved with an increase of the amount of Ni. However, if the amount of Ni in terms of Ni metal is more than 1000 mg/m$^2$ per one side, the above-described effect is saturated. Thus, the above case is economically not preferable.

Thus, the amount of Ni in the Ni coated layer 102 is set to be 10 to 1000 mg/m$^2$ in terms of Ni metal per one side. The amount of Ni in the Ni coated layer 102 is preferably 30 to 800 mg/m$^2$ in terms of Ni metal per one side. The amount of Ni is more preferably 50 to 600 mg/m$^2$ in terms of Ni metal per one side.

The Ni coated layer 102 may be formed on both surfaces of the steel sheet 101, or may be formed only on one surface of the steel sheet 101 from a viewpoint of reducing producing cost and the like. In a case where a steel sheet 101 having the Ni coated layer 102 formed only on one surface thereof is subjected to can making, for example, it is preferable that working is performed with the surface on which the Ni coated layer 102 is formed being an inner surface of a container.

The amount of Ni in the Ni coated layer 102 can be measured, for example, by a fluorescent X-ray method. In this case, a calibration curve relating to the amount of Ni has been created in advance using a sample in which the amount of Ni has been known, and then the amount of Ni is relatively measured using the created calibration curve.

[Case where Composite Coated Layer 103 is Formed on Surface of Steel Sheet 109]

A case where the composite coated layer 103 is formed on the surface of the steel sheet 101 will be described with reference to FIG. 2.

The composite coated layer 103 contains Ni in an amount of 5 to 150 mg/m$^2$ in terms of Ni metal and Sn in an amount of 300 to 3000 mg/m$^2$ in terms of Sn metal. In the composite coated layer 103, an island-shaped Sn coated layer 103e is formed on an Fe—Ni—Sn alloy layer 103d.

In order to form the composite coated layer 103, firstly, a Ni coated layer (not shown in figure) is formed on the steel sheet 101. The Ni coated layer (not shown in figure) is constructed of Ni or an Fe—Ni alloy, and is formed for ensuring corrosion resistance of the steel sheet for a container 10.

The degree of improving corrosion resistance by Ni is determined in accordance with the amount of Ni in the composite coated layer 103. If the amount of Ni in the composite coated layer 103 is equal to or more than 5 mg/m$^2$ in terms of Ni metal per one side, suitable corrosion resistance is obtained. As the amount of Ni in the composite coated layer 103 is increased, corrosion resistance is improved more. However, in a case where the amount of Ni in the composite coated layer 103 is more than 150 mg/m$^2$ in terms of Ni metal per one side, corrosion resistance is saturated. Thus, this case is economically not preferable.

Thus, the amount of Ni in the composite coated layer 103 is set to 5 to 150 mg/m$^2$ in terms of Ni metal per one side. The amount of Ni in the composite coated layer is preferably 10 to 120 mg/m$^2$ and more preferably 20 to 70 mg/m$^2$ in terms of Ni metal per one side.

When the composite coated layer 103 is formed, a Sn coated layer (not shown in figure) is formed as an upper layer of the Ni coated layer (not shown in figure).

The Sn coated layer (not shown in figure) is formed for ensuring corrosion resistance and weldability of the steel sheet for a container 10. Regarding Sn, Sn itself has high corrosion resistance, and a Sn alloy formed by reflow treatment also has excellent corrosion resistance and weldability.

"Sn coating" in the embodiment includes a case of mixing irreversible impurities in Sn metal or a case of adding a trace element to Sn metal, in addition to coating with Sn metal.

Reflow treatment is performed after the Sn coated layer (not shown in figure) is formed, and thus the composite coated layer 103 is formed. That is, reflow treatment is performed after the Sn coated layer (not shown in figure) is formed, and thus the Fe—Ni—Sn alloy layer 103d is formed on the steel sheet 101, and the island-shaped Sn coated layer 103e is formed on the Fe—Ni—Sn alloy layer 103d.

In the island-shaped Sn coated layer 103e, Sn is provided to as to have an island shape, and the Fe—Ni—Sn alloy layer 103d which is the lower layer is exposed at the sea portion. With the island-shaped Sn coated layer 103e, film adhesion and lacquer adhesion of the steel sheet for a container 10 is ensured.

In heat treatment after film lamination is performed or coating with a lacquer is performed, the steel sheet for a container 10 may be heated up to a temperature of the melting point (232° C.) of Sn or higher. In a case where the entirety of the surface of the Fe—Ni—Sn alloy layer 103d is coated with Sn, being different from the embodiment, the above-described heat treatment causes Sn to be molten or oxidized. There is a probability of not allowing ensuring of film adhesion and lacquer adhesion of the steel sheet for a container 10. Thus, this case is not preferable.

The excellent corrosion resistance of Sn is significantly improved in a case where the amount of Sn is equal to or more than 300 mg/m$^2$ in terms of Sn metal per one side. As the amount of Sn is increased, corrosion resistance is improved more. Thus, the amount of Sn in the composite coated layer 103 is set to be equal to or more than 300 mg/m$^2$ in terms of Sn metal per one side.

The above-described effect by Sn is saturated if the amount of Sn is more than 3000 mg/m$^2$ in terms of Sn metal per one side. If the amount of Sn is more than 3000 mg/m$^2$ in terms of Sn metal per one side, it may be difficult to form the island-shaped Sn coated layer 103e. Thus, the amount of Sn is set to be equal to or less than 3000 mg/m$^2$ per one side.

For the above-described reasons, the amount of Sn in the composite coated layer 103 is set to be 300 to 3000 mg/m$^2$ in terms of Sn metal per one side. The amount of Sn is preferably 500 to 2000 mg/m$^2$ and more preferably 600 to 1200 mg/m$^2$ in terms of Sn metal per one side.

After such Sn coating, reflow treatment is performed. The reflow treatment is performed for the purpose as follows. Sn is melted, and is alloyed with Fe in the steel sheet 101 or Ni in the Ni coated layer (not shown in figure), so as to form the Fe—Ni—Sn alloy layer 103d and improve corrosion resistance, and to form the island-shaped Sn coated layer 103e. The island-shaped Sn coated layer 103e can be formed by appropriately controlling conditions (treatment temperature, treatment time, and the like) of the reflow treatment.

The composite coated layer 103 may be formed on both surfaces of the steel sheet 101, or may be formed only on one surface of the steel sheet 101 from a viewpoint of reducing producing cost and the like. In a case where a steel sheet 101 having the composite coated layer 103 formed only on one surface thereof is subjected to can making, for example, it is preferable that working is performed with the surface on which the composite coated layer 103 is formed being an inner surface of a container.

The Amount of Ni metal and the amount of Sn metal in the composite coated layer 103 can be measured, for example, by a fluorescent X-ray method. In this case, a calibration curve relating to the amount of Ni has been created in advance using a sample in which the amount of Ni has been known, and then the amount of Ni is relatively measured using the created calibration curve. Similarly, also in a case of the amount of Sn, a calibration curve relating to the amount of Sn metal has been created in advance using a sample in which the amount of Sn has been known, and then the amount of Sn metal is relatively measured using the created calibration curve.

In a case where only the Ni coated layer 102 or the composite coated layer 103 is formed on the surface of the steel sheet 101, even though the Ni coated layer 102 or the composite coated layer 103 is subjected to surface treatment with the coating agent, sulfur contained in beverage, food, and the like may be transmitted through the coating agent, and be bonded to Ni or Sn. Thus, NiS, SnS, $SnS_2$, or the like which has a black color may be formed.

In a case where a coating fault portion constructed of a plurality of fine holes is provided in the Ni coated layer 102 or the composite coated layer 103, sulfur may be bonded to Fe contained in the steel sheet 101, and thus FeS, $Fe_2S_3$, or $Fe_2S$ which has a black color may be formed. In the embodiment, a phenomenon in which a black compound such as NiS, SnS, $SnS_2$, FeS, $Fe_2S_3$, or $Fe_2S$ is generated is referred to as sulphide stain. Resistance (characteristics) against sulphide stain is referred to as sulphide stain resistance.

The steel sheet for a container 10 includes a chemical treatment layer 105 as an upper layer of the Ni coated layer 102 or the composite coated layer 103, in order to improve sulphide stain resistance.

The chemical treatment layer 105 contains a Zr compound in an amount of 3.0 to 30.0 mg/m$^2$ in terms of Zr metal, and a Mg compound in an amount of 0.50 to 5.00 mg/m$^2$ in terms of Mg metal.

The Zr compound contained in the chemical treatment layer 105 has a function of improving sulphide stain resistance, adhesion, and workability.

Examples of the Zr compound according to the embodiment include Zr oxide, Zr phosphate, Zr hydroxide, and Zr fluoride (including a hydrate of each of the substances). The chemical treatment layer 105 contains plural types of the above-described Zr compounds.

If the amount of Zr in the chemical treatment layer 105 is increased, sulphide stain resistance, adhesion, and workability of the steel sheet for a container 10 are improved. Specifically, in a case where the amount of Zr in the chemical treatment layer 105 is equal to or more than 3.0 mg/m$^2$ in terms of Zr metal per one side, practically suitable sulphide stain resistance is ensured.

If the amount of Zr is more than 30.0 mg/m$^2$ in terms of Zr metal per one side, the chemical treatment layer 105 is too thick, and thus adhesion of the chemical treatment layer 105 itself is deteriorated, and sulphide stain resistance is degraded. In addition, if the amount of Zr is more than 30.0 mg/m$^2$ in terms of Zr metal per one side, electric resistance of the chemical treatment layer 105 may be increased, and thus weldability may be degraded.

Thus, the amount of Zr in the chemical treatment layer 105 is set to 3.0 to 30.0 mg/m$^2$ in terms of Zr metal per one side. The lower limit value of the amount of Zr is preferably equal to or more than 5.0 mg/m$^2$, and more preferably equal to or more than 8.0 mg/m$^2$ in terms of Zr metal per one side. The upper limit value of the amount of Zr is preferably equal to or less than 20.0 mg/m$^2$, and more preferably equal to or less than 15.0 mg/m$^2$ in terms of Zr metal per one side.

The chemical treatment layer 105 contains the Mg compound in addition to the Zr compound. As will be described later, a chemical treatment solution used when the chemical treatment layer 105 is formed contains Mg ions. The Mg ions in the chemical treatment solution are taken, as the Mg compound, into the chemical treatment layer 105 along with the Zr compound. The Mg compound in the chemical treatment layer 105 may be partially removed from the chemical treatment layer 105 by washing performed after forming the chemical treatment layer 105. However, the remainder remains in the chemical treatment layer 105.

The inventors found that the chemical treatment layer 105 contained the Mg compound, and thus sulphide stain resistance was improved.

Examples of the Mg compound included in the chemical treatment layer 105 include Mg oxide, Mg hydroxide, Mg fluoride, and Mg phosphate (including a hydrate of each of the substances). The chemical treatment layer 105 may contain plural types of the above-described Mg compounds. Generally, the Mg compounds are transparent or white.

A Mg ion is bonded to a thiol ion (HS$^-$) or hydrogen sulphide (H$_2$S) which functions as the subject of the sulphide stain phenomenon, thereby forming a transparent or white compound. The Mg ion is bonded to the thiol ions or hydrogen sulphide, and thus it is possible to limit bonding of Fe, Ni, or Sn to a thiol ion or hydrogen sulphide.

Further, the Mg compound in the chemical treatment layer 105 suppresses a thiol ion and hydrogen sulphide from being transmitted through the chemical treatment layer 105. A compound generated by a reaction of a Mg ion with a thiol ion or hydrogen sulphide also suppresses the thiol ion or hydrogen sulphide from being transmitted through the chemical treatment layer 105.

That is, the chemical treatment layer 105 contains the Mg compound, and thus it is possible to reduce a probability of an occurrence of a reaction of Ni, Sn, or Fe with a thiol ion or hydrogen sulphide. Accordingly, it is possible to reduce an occurrence of the sulphide stain phenomenon.

In order to ensure sulphide stain resistance as described above, the chemical treatment layer 105 contains the Mg compound in an amount of 0.50 to 5.00 mg/m$^2$ in terms of Mg metal per one side.

The amount of Mg in the chemical treatment layer 105 is equal to or more than 0.50 mg/m$^2$ in terms of Mg metal per one side, and thus practically suitable sulphide stain resistance is obtained.

Adding the large amount of the Mg compound to the chemical treatment solution is required for causing the chemical treatment layer 105 to contain the Mg compound which is more than 5.00 mg/m$^2$ in terms of Mg metal per one side. If the large amount of the Mg compound is included in the chemical treatment solution, forming the chemical treatment layer 105 may not suitably proceed. Thus, this case is not preferable. In addition, if the chemical treatment layer 105 contains more than 5.00 mg/m$^2$ in terms of Mg metal of the Mg compound per one side, although adhesion (primary adhesion) between the chemical treatment layer 105 and the coating agent is not influenced, adhesion (secondary adhesion) during high-temperature sterilization treatment under existence of water vapor, such as retort treatment, rust resistance, or corrosion under the lacquer may be deteriorated. Thus, this case is not preferable. Further, if the chemical treatment layer 105 contains the Mg compound which is more than 5.00 mg/m$^2$ in terms of Mg metal per one side, when the steel sheet for a container 10 is used in a container for food, taste and flavor of the contents may be lost. Thus, this case is not preferable.

The lower limit value of the amount of the Mg compound in the chemical treatment layer 105 is preferably 0.80 mg/m$^2$ and more preferably 1.00 mg/m$^2$ in terms of Mg metal per one side. The upper limit value of the amount of the Mg compound in the chemical treatment layer 105 is preferably 4.00 mg/m$^2$ and more preferably 3.00 mg/m$^2$ in terms of Mg metal per one side.

The amount of the Zr compound or the amount of the Mg compound in the chemical treatment layer 105 is the total amount of Zr metal or Mg metal in the chemical treatment layer 105, which is determined, for example, by a quantitative analysis method such as fluorescent X-ray analysis, and means the amount of the Zr compound or the Mg compound which remains in the chemical treatment layer 105 after washing which will be described later.

In a case where the Ni coated layer 102 or the composite coated layer 103 contains Mg, the amount of the Mg compound in the chemical treatment layer 105 can be measured by measuring the amount of the Mg compound in the Ni coated layer 102 or the composite coated layer 103 before chemical treating, measuring the amount of the Mg compound in the steel sheet for a container 10 after the chemical treating, and determining a difference therebetween.

The chemical treatment layer 105 may contain phosphoric acid, phosphate, or a combination thereof, in addition to the Zr compound and the Mg compound. Examples of the phosphate included in the chemical treatment layer 105 include Zr phosphate and Mg phosphate (including a hydrate of each of the substances). The chemical treatment layer 105 may contain plural types of compounds among compounds configured from phosphoric acid and phosphate.

The chemical treatment layer 105 contains phosphoric acid, phosphate, or a combination thereof, and thus it is possible to obtain excellent sulphide stain resistance and adhesion. If the total amount of phosphoric acid and phosphate is equal to or more than 1.5 mg/m$^2$ in terms of P per one side, it is possible to obtain practically suitable sulphide stain resistance and adhesion.

If the total amount of phosphoric acid and phosphate is increased, sulphide stain resistance and adhesion are improved. However, if the total amount of phosphoric acid and phosphate is more than 25.0 mg/m$^2$ in terms of P per one side, adhesion of phosphoric acid or phosphate in the chemical treatment layer 105 is deteriorated, and thus adhesion to the coating agent and corrosion under the lacquer is degraded. Thus, this case is not preferable. If the total amount of phosphoric acid and phosphate is more than 25.0 mg/m$^2$ in terms of P per one side, electric resistance is increased, and weldability is deteriorated. Thus, this case is not preferable.

Thus, it is preferable that the chemical treatment layer 105 contains phosphoric acid and phosphate having the total amount of 1.5 to 25.0 mg/m$^2$ in terms of P per one side.

The lower limit value of the total amount of phosphoric acid and phosphate is more preferably 2.5 mg/m$^2$ and further preferably 5.0 mg/m$^2$ in terms of P per one side.

The upper limit value of the total amount of phosphoric acid and phosphate is more preferably 20.0 mg/m$^2$ and further preferably 12.5 mg/m$^2$ in terms of P per one side.

Regarding the total amount of phosphoric acid and phosphate contained in the chemical treatment layer 105, the amount of P included in the chemical treatment layer 105 after washing may be determined, for example, by a quantitative analysis method such as such as fluorescent X-ray analysis.

[Method for Producing Steel Sheet for a Container 10]

Next, a method for producing the steel sheet for a container 10 will be described with reference to FIG. 3.

Figure 3:
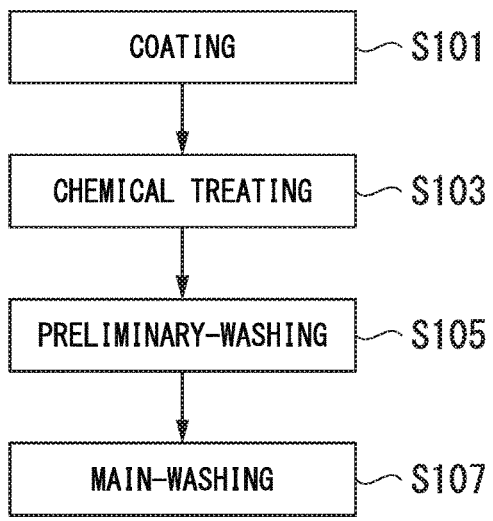
FIG. 3 is a flowchart showing a flow of a method for producing a steel sheet for a container according to the embodiment.

FIG. 3 is a flowchart showing a method for producing the steel sheet for a container 10 according to the embodiment. As shown in FIG. 3, the method for producing the steel sheet for a container 10 includes coating, chemical treating, and washing.

[Coating]

Firstly, a Ni coated layer 102 or a composite coated layer 103 is formed on the surface of a steel sheet 101 (S101).

[Case where Ni Coated Layer 102 is Formed on Surface of Steel Sheet 101]

In a case where the Ni coated layer 102 is formed on the surface of the steel sheet 101, a method of forming the Ni coated layer 102 is not particularly limited. Examples of the method of forming the Ni coated layer 102 include an electro coating method using a watt bath and the like, a vacuum deposition method, or a sputtering method. Heat treatment may be performed after the Ni coated layer 102 has been formed, in order to apply a diffusion layer (not shown in figure) to the Ni coated layer 102.

[Case where Composite Coated Layer 103 is Formed on Surface of Steel Sheet 101]

In a case where the composite coated layer 103 is formed on the surface of the steel sheet 101, a Ni coated layer (not shown in figure) is formed on the surface of the steel sheet 101, and then a Sn coated layer (not shown in figure) is formed on the Ni coated layer (not shown in figure) and reflow treatment is performed.

The Ni coated layer (not shown in figure) is formed of Ni or an Fe—Ni alloy. A method of forming the Ni coated layer (not shown in figure) is not particularly limited. Known methods (for example, cathode electrolysis method) which are generally performed in an electro coating method can be used.

In a case where the Ni coated layer (not shown in figure) is formed by a diffusion coating method, Ni coating is performed on the surface of the steel sheet 101, and then diffusion treatment for forming the diffusion layer (not shown in figure) is performed in an annealing furnace. Nitriding treatment may be performed before or after the diffusion treatment, or simultaneously with the diffusion treatment. Even in a case where nitriding treatment is performed, the effect of Ni and an effect of a nitride-treated layer (not shown in figure) do not interfere with each other, and the effects can be exhibited together.

A method of forming the Sn coated layer (not shown in figure) is not particularly limited. Known electro coating methods, a method of coating by immersing a steel sheet into molten Sn, and the like can be used.

After the Sn coated layer (not shown in figure) is formed, reflow treatment (reflow treatment) is performed. The reflow treatment is performed for the purpose as follows. Sn is melted, and is alloyed with Fe in the steel sheet 101 or Ni in the Ni coated layer (not shown in figure), so as to form an Fe—Ni—Sn alloy layer 103d and improve corrosion resistance of the steel sheet for a container 10, and to form an island-shaped Sn coated layer 103e. The island-shaped Sn coated layer 103e can be formed by appropriately controlling conditions (treatment temperature, treatment time, or the like) of the reflow treatment.

[Chemical Treating]

Then, chemical treating is performed to form a chemical treatment layer 105 as an upper layer of the Ni coated layer 102 or composite coated layer 103 (S103).

In the chemical treating, cathode electrolysis treatment is performed using a chemical treatment solution.

In a case where an immersion treatment method is used as the method of forming the chemical treatment layer 105, since the base is etched, adhering of the chemical treatment layer 105 is not uniform, and a period for the chemical treating is long. Accordingly, this case is not preferable in a point of industrial production.

In cathode electrolysis treatment, forcible charge transfer, and hydrogen generation at an interface between the steel sheet 101 and the chemical treatment solution cause the surface of the formed chemical treatment layer 105 to be cleaned. Thus, cathode electrolysis treatment is preferable. In cathode electrolysis treatment, pH of the chemical treatment solution is increased, and thus adhering of the chemical treatment layer 105 is accelerated. Accordingly, the cathode electrolysis treatment is preferable.

Conditions for cathode electrolysis treatment are not particularly limited. For example, cathode electrolysis treatment may be performed under the conditions in which the temperature of the chemical treatment solution is 10° C. to 60° C., current density is 0.1 to 20.0 A/dm$^2$, and the treatment time is 0.01 to 30 seconds.

pH of the chemical treatment solution is preferably in a range of 3.0 to 4.5. Nitric acid, hydrofluoric acid, or the like may be added in a case of decreasing pH, and ammonia and the like may be added in a case of increasing pH.

The chemical treatment solution used in the chemical treating contains 100 to 3000 ppm of Zr ions. Zr ions in the chemical treatment solution are taken into the chemical treatment layer 105, as the Zr compound.

The lower limit value of the Zr ions in the chemical treatment solution is preferably 500 ppm and more preferably 1000 ppm. The upper limit value of the Zr ions in the chemical treatment solution is preferably 2500 ppm and more preferably 2000 ppm.

The chemical treatment solution contains 120 to 4000 ppm of F ions. F ions have a function of forming complex ions along with Zr ions, so as to stabilize the Zr ions in the chemical treatment solution.

F ions in the chemical treatment solution are also taken into the chemical treatment layer 105, similarly to Zr ions. However, it is preferable that a F compound in the chemical treatment layer 105 is removed by washing (which will be described later), as much as possible.

The chemical treatment solution contains 50 to 300 ppm of Mg ions.

The chemical treatment solution contains Mg ions, and thus the Mg compound is included in the chemical treatment layer 105 and sulphide stain resistance is improved. Thus, containing Mg ions is preferable. Further, the Mg ions may accelerate precipitation of the Zr ions. Specifically, if the amount of the Zr compound in the chemical treatment layer 105, which is formed by the chemical treating, is compared between a case where the chemical treatment solution contains Mg ions and a case of not containing Mg ions, the amount of the Zr compound in the chemical treatment layer 105 in the case of containing the Mg ions is larger than that in the case of not containing the Mg ions.

The cause of the Zr precipitation acceleration effect of Mg ions is considered as follows.

$$[ZrF_6]^{2-} \rightleftharpoons Zr^{4+} + 6F^- \tag{1}$$

As represented by Formula (1), Zr ions are stably provided along with F ions in a solution including the Zr ions and the F ions, in a state of complex ions such as $[ZrF_6]^{2-}$. In cathode electrolysis treatment, forcible charge transfer, and hydrogen generation at an interface between the steel sheet 101 and the chemical treatment solution causes pH to be increased. pH is increased, and thus the above-described complex ions are subjected to hydrolysis and are decomposed into Zr ions and F ions, as represented by Formula (1). After that, the chemical treatment layer 105 including the Zr compound is precipitated.

The reaction of Formula (1) is an equilibrium (reversible) reaction. However, the number of F ions in the chemical treatment solution is increased, and thus a reaction directed to the right in Formula (1) (reaction of decomposing complex ions) is largely hindered.

The Mg ions have a function as a scavenger of the F ions, and reduce the effect of hindering the reaction directed to the right in Formula (1) by the F ions. That is, the followings are considered. The existence of Mg ions causes the F ions to form water soluble [F$^-$... Mg$^{2+}$... F$^-$] by "flexible ionic interaction". Thus, the concentration of the F ions in the vicinity of a precipitation portion of [F$^-$... Mg$^{2+}$... F$^-$] is reduced, and the effect of hindering the reaction directed to the right in Formula (1) is reduced. It is preferable that the concentration of the Mg ions added to the chemical treatment solution is adjusted so that [F$^-$... Mg$^{2+}$... F$^-$] decomposes into F ions and Mg ions in a site apart from the precipitation site of [F$^-$... Mg$^{2+}$... F$^-$].

As described above, the chemical treatment solution contains Mg ions, and thus precipitation of Zr is accelerated. Thus, in the method for producing the steel sheet for a container 10 according to the embodiment, it is possible to reduce a period required for the chemical treating, and thus excellent productivity is obtained.

The concentration of the Mg ions added to the chemical treatment solution is preferably 50 to 300 ppm. If the concentration of the Mg ions is less than 50 ppm, the amount of the Mg ions is not sufficient for exhibiting a Zr precipitation acceleration effect. If the concentration of the Mg ions is more than 300 ppm, insoluble $MgF_2$ is easily formed. Thus, this case is not preferable.

The concentration of the Mg ions added to the chemical treatment solution is more preferably 100 to 200 ppm.

It is preferable that the Mg ions are added in a form of an easily water-soluble salt of Mg nitrate, Mg sulfate, or the like.

The chemical treatment solution may contain 2000 ppm or less of phosphate ions.

The chemical treatment solution contains the phosphate ions, and thus the chemical treatment layer 105 contains phosphoric acid or phosphate, and sulphide stain resistance and adhesion are improved. Thus, this is preferable.

The chemical treatment solution contains nitrate ions and ammonium ions having the total amount of 20000 ppm or less. The chemical treatment solution contains the nitrate ions and the ammonium ions, and thus it is possible to reduce a period required for the chemical treating, and to improve productivity. Thus, this is preferable.

It is preferable that the chemical treatment solution not contains any one of nitrate ions and ammonium ions, but contains both of the nitrate ions and the ammonium ions. The reason is as follows.

When the chemical treatment layer 105 which contains Zr is formed, a reaction of the following Formula (2) causes $H_2$ to be generated in a cathode, and thus the pH is increased.

$$2H_2O + 4e^+ \rightarrow H_2\uparrow + 2OH^- \tag{2}$$

With the reaction of Formula (2), $Zr^{4+}$ and $PO_4^{3-}$ are precipitated in a form of $ZrO_2$, $Zr_3(PO_4)_4$, and the like, and the chemical treatment layer 105 is formed. In the film forming reaction, if nitrate ions are provided, a reaction which is represented by the following Formula (3) and Formula (4) and is directed to the right causes an increase of pH to be accelerated. As a result, film formation is accelerated. The reaction represented by the following Formula (3) and Formula (4) inhibits generation of $H_2$ which hinders film forming with a stirring action. Thus, it is possible to reduce the period required for the chemical treating. It is considered that the ammonium ions have movement for accelerating the above-described effect by the nitrate ions.

The point that the chemical treatment solution containing Mg ions, nitrate ions, and ammonium ions has the above-described suitable effect is firstly clarified by the present invention.

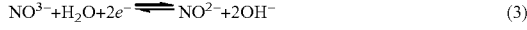

$$NO^{3-} + H_2O + 2e^- \rightleftharpoons NO^{2-} + 2OH^- \tag{3}$$

$$NO^{2-} + 5H_2O + 2e^{31} \rightleftharpoons NH_3 + 5OH^- \tag{4}$$

In order to further improve characteristics such as sulphide stain resistance, for example, a second layer (not shown in figure) of the chemical treatment layer 105 may be formed over the first layer of the chemical treatment layer 105 by, firstly, cathode electrolysis treating using a first chemical treatment solution so as to form the first layer (not shown in figure) of the chemical treatment layer 105 on the Ni coated layer 102 or composite coated layer 103 side, and then, cathode electrolysis treating using a second chemical treatment solution.

Although the first chemical treatment solution and the second chemical treatment solution contain the same components, the first chemical treatment solution and the second chemical treatment solution are different in only temperature. Examples of the temperature of the first chemical treatment solution include a range of 10° C. to 40° C. Examples of the temperature of the second chemical treatment solution include a range of 45° C. to 60° C.

The first layer of the chemical treatment layer 105 is a dense layer, and thus is suitable for ensuring the characteristics such as sulphide stain resistance. The second layer of the chemical treatment layer 105 has a rough surface, and thus is suitable for ensuring adhesion between the chemical treatment layer 105 and the coating agent.

[Washing]

The water-soluble ion type such as F ions, nitrate ions, and ammonium ions is included in the chemical treatment solution, and thus is taken into the chemical treatment layer 105 along with the Zr compound. The above ion type in the chemical treatment layer 105 does not have an influence on adhesion (primary adhesion) to the coating agent, but is the cause of deteriorating secondary adhesion, rust resistance, or corrosion under the lacquer. The reason is considered as follows. The above ion types in the chemical treatment layer 105 are eluted into water vapor or a corrosion liquid, and thus decompose a bond between the chemical treatment layer 105 and the coating agent or corrode the steel sheet 101.

Thus, in the embodiment, after the chemical treating, at least washing (referred to as main-washing below) with water at a temperature of 40° C. or higher for 0.5 seconds or longer is performed (S107). The upper limit of the temperature of water used in the main-washing is not particularly limited. However, an effect of the main-washing is exhibited stronger with the higher temperature, and, for example, the temperature is 90° C. to 100° C. The upper limit of a washing period of the main-washing is not particularly limited. However, the effect thereof is exhibited stronger with the longer period, and, for example, the period is 10 seconds.

In order to further remove the water-soluble ion type such as F ions, nitrate ions, and ammonium ions, from the chemical treatment layer 105, washing (referred to as preliminary-washing below) with water at a temperature of 10° C. or more and lower than 40° C. for 0.5 seconds or longer is preferably performed after the chemical treating and before the main-washing (S105). The upper limit of a washing period of the preliminary-washing is not particularly limited. However, the effect thereof is exhibited stronger with the longer period, and, for example, the period is 20 seconds.

As a washing method for the preliminary-washing and the main-washing, an immersing treatment and a spray treatment are exemplary examples.

An ion type to be eluted at a low temperature is removed by the preliminary-washing, and an ion type to be eluted at a high temperature is removed by the main-washing. The treatment time for the preliminary-washing and the main-washing are set to be long, and thus the removal effect is improved. An effect of a washing liquid used in the main-washing is improved with a higher temperature.

If the treatment time for the preliminary-washing and the main-washing is shorter than 0.5 seconds, it is difficult to reduce the ion type.

It is preferable that the F ions, the nitrate ions, the ammonium ions, and the like are removed from the chemical treatment layer 105 by the washing as much as possible. However, the F ions, the nitrate ions, the ammonium ions, and the like may unavoidably remain without totally removing.

In the method for producing a steel sheet for a container according to the embodiment, nitrate ions having high concentration are not used. Thus, the method is environmentally suitable.

Example 1

Examples and comparative examples of the present invention will be described below. The examples which will be described below are just an example of the steel sheet for a container and the method for producing the steel sheet for a container according to the embodiment of the present invention. The steel sheet for a container and the method for producing the steel sheet for a container according to the embodiment of the present invention are not limited to the examples which will be described below.

In order to examine the Zr precipitation acceleration effect of Mg ions, the amount of the Zr compound in the chemical treatment layers formed by the chemical treating in which the concentration of the Mg ions was changed and conditions other than the concentration of the Mg ions were same. Results are shown in Table 1.

All of treatment solutions 1-1 to 3-2 in Table 1 have the same temperature and the same pH. Cathode electrolysis treatment is performed under conditions of the same current density and the same treatment time. As shown in Table 1, it was confirmed that addition of the Mg ions caused the amount of Zr in the formed chemical treatment layer to be increased, and the Mg ions had the Zr precipitation acceleration effect.

TABLE 1

| TREATMENT SOLUTION | TREATMENT SOLUTION COMPOSITION (ppm) | | | | AMOUNT OF Zr |
|---|---|---|---|---|---|
| No. | Zr | $PO_4$ | T-F | $NO_3$ | Mg | $(mg/m^2)$ |
| 1-1 | 1400 | 0 | 1800 | 0 | 200 | 9 |
| 1-2 | 1400 | 0 | 1800 | 0 | 0 | 4 |
| 2-1 | 1400 | 900 | 1800 | 1600 | 200 | 48 |
| 2-2 | 1400 | 900 | 1800 | 1600 | 0 | 20 |
| 3-1 | 1400 | 900 | 1800 | 12000 | 200 | 94 |
| 3-2 | 1400 | 900 | 1800 | 12000 | 0 | 48 |

Example 2

Test materials were produced using chemical treated steel sheets which had coated layers and chemical treatment layers shown in Table 2, and performance evaluations for following items of (A) to (H) were performed. Evaluation results are shown in Table 3.

(A) Sulphide Stain Resistance

The test materials were cut out to have a size of 60 mm×60 mm, and end portions (portion at which an end surface of a steel sheet was exposed by shearing) were subjected to masking by tapes with a length of 5 mm thereof. The resultants were immersed in 1 mass % of a $Na_2S$ aqueous solution (pH was adjusted to be 7 by lactic acid), and retort treatment was performed at a temperature of 125°

C. for 60 minutes. The appearance of each test materials after the retort treatment was visually evaluated.

Specifically, a case of a result better than that of a chromate-treated material was evaluated as "Very Good". A case of a result which was slightly better than that of the chromate-treated material was evaluated as "Good". A case where discoloring of a degree equivalent to that of the chromate-treated material occurred was evaluated as "Average". A case where the degree of discoloring was slightly larger than that of the chromate-treated material was evaluated as "Fair". A case where the degree of discoloring was larger than that of the chromate-treated material was evaluated as "Poor".

(B) Workability

PET films having a thickness of 20 μm were adhered to both surfaces of the test materials at a temperature of 200° C., and the test materials were subjected to can making by drawing and ironing in stages. Defects, floating, and exfoliation of the film were observed, and thus workability was evaluated from the area ratio thereof.

Specifically, a case where all of defects, floating, and exfoliation of the film were not observed was evaluated as "Very Good". A case where the area ratio of the defects, the floating, and the exfoliation of the film was more than 0% and 0.5% or less was evaluated as "Good". A case where the area ratio of the defects, the floating, and the exfoliation of the film was more than 0.5% and 15% or less was evaluated as "Fair". A case where the area ratio of the defects, the floating, and the exfoliation of the film was more than 15% was evaluated as "Poor".

The area ratio was obtained by dividing an area of portions of the film, at which the defects, the floating, and the exfoliation were observed, by the total area of the adhering PET film.

(C) Weldability

The test materials were welded with changing a current, under a condition of a welding wire speed of 80 m/min using a wire seam welding machine. Weldability was evaluated with the overall determination based on an adequate current range including the minimum current value which allowed sufficient welding strength to be obtained, and the maximum current value which caused dust and welding defects such as welding spatter to start to be noticeable.

Specifically, a case where the adequate current range on the secondary side was equal to or greater than 1500 A was evaluated as "Very Good". A case where the adequate current range on the secondary side was 800 A or greater and less than 1500 A was evaluated as "Good". A case where the adequate current range on the secondary side was 100 A or greater and less than 800 A was evaluated as "Fair". A case where the adequate current range on the secondary side was less than 100 A was evaluated as "Poor".

(D) Film Adhesion

A PET films having a thickness of 20 μm were printed on both surfaces of the test materials at a temperature of 200° C., and drawing ironing was performed. Thus, a can body was produced. Retort treatment was performed at a temperature of 125° C. for 30 minutes. Then, an exfoliation status of the film was observed, and film adhesion was evaluated based on an exfoliation area ratio.

Specifically, a case where the exfoliation area ratio was 0% was evaluated as "Very Good". A case where the exfoliation area ratio was more than 0% and 2% or less was evaluated as "Good". A case where the exfoliation area ratio was more than 2% and 10% or less was evaluated as "Fair". A case where the exfoliation area ratio was more than 10% was evaluated as "Poor".

(E) Primary Lacquer Adhesion

The test materials were coated with an epoxy-phenol resin, and baking treatment was performed at a temperature of 200° C. for 30 minutes. A lattice net which had an interval of 1 mm and a depth as deep as reaching the base metal was put thereon, and then was exfoliated by a tape. An exfoliation status thereof was observed, and primary lacquer adhesion was evaluated based on an exfoliation area ratio.

Specifically, a case where the exfoliation area ratio was 0% was evaluated as "Very Good". A case where the exfoliation area ratio was more than 0% and 5% or less was evaluated as "Good". A case where the exfoliation area ratio was more than 5% and 30% or less was evaluated as "Fair". A case where the exfoliation area ratio was more than 30% was evaluated as "Poor".

(F) Secondary Lacquer Adhesion

The test materials were coated with an epoxy-phenol resin, and baking treatment was performed at a temperature of 200° C. for 30 minutes. A lattice net which had an interval of 1 mm and a depth as deep as reaching the base metal was put thereon, and then retort treatment was performed at a temperature of 125° C. for 30 minutes. After drying, the lacquer was exfoliated using a tape. Then, an exfoliation status thereof was observed, and secondary lacquer adhesion was evaluated based on an exfoliation area ratio.

Specifically, a case where the exfoliation area ratio was 0% was evaluated as "Very Good". A case where the exfoliation area ratio was more than 0% and 5% or less was evaluated as "Good". A case where the exfoliation area ratio was more than 5% and 30% or less was evaluated as "Fair". A case where the exfoliation area ratio was more than 30% was evaluated as "Poor".

(G) Corrosion Resistance Under Lacquer

The test materials were coated with an epoxy-phenol resin, and baking treatment was performed at a temperature of 200° C. for 30 minutes. Then, a lattice net which had a depth as deep as reaching the base metal was put thereon, and then was immersed in a test solution at a temperature of 45° C. for 72 hours. The test solution was formed of 1.5% citric acid-1.5% salt mixed solution. After washing and drying, tape exfoliation was performed. A corrosion status at a portion at which the net had been put, under the lacquer, and a corrosion status at a flat portion were observed, and corrosion resistance under lacquer was evaluated based on the evaluation of the width of a portion at which corrosion under the lacquer had occurred, and a corrosion area ratio of the flat portion.

Specifically, a case where the corrosion-under-coating-film width was less than 0.2 mm and the corrosion area ratio of the flat portion was 0% was evaluated as "Very Good". A case where the corrosion-under-coating-film width was 0.2 mm or more and less than 0.3 mm and the corrosion area ratio of the flat portion was more than 0% and 1% or less was evaluated as "Good". A case where the corrosion-under-coating-film width was 0.3 mm or more and less than 0.45 mm and the corrosion area ratio of the flat portion was more than 1% and 5% or less was evaluated as "Fair". A case where the corrosion-under-coating-film width was 0.45 mm or more and the corrosion area ratio of the flat portion was more than 5% was evaluated as "Poor".

(H) Retort Rust Resistance

Retort treatment was performed on the test materials at a temperature of 125° C. for 30 minutes. Then, an occurrence status of rust was observed, and retort rust resistance was evaluated based on a rust occurrence area ratio.

Specifically, a case where the rust occurrence area ratio was 0% was evaluated as "Very Good (VG)". A case where the rust occurrence area ratio was more than 0% and 1% or less than was evaluated as "Good (G)". A case where the rust occurrence area ratio was more than 1% and 5% or less was evaluated as "Fair (F)". A case where the rust occurrence area ratio was more than 5% was evaluated as "Poor (P)".

TABLE 2

| | | COATED LAYER | | | | CHEMICAL TREATMENT LAYER | | |
| --- | --- | --- | --- | --- | --- | --- | --- | --- |
| | | Ni COATED LAYER | COMPOSITE COATED LAYER | | | | | |
| | No. | AMOUNT OF Ni METAL (mg/m²) | AMOUNT OF Ni METAL (mg/m²) | AMOUNT OF Sn METAL (mg/m²) | EXISTENCE STATE OF ISLAND-SHAPED Sn | AMOUNT OF Zr METAL (mg/m²) | AMOUNT OF Mg METAL (mg/m²) | AMOUNT OF P (mg/m²) |
| INVENTION EXAMPLES | A1 | 11 | — | — | — | 19.8 | 4.80 | — |
| | A2 | 1000 | — | — | — | 12.2 | 2.50 | — |
| | A3 | 650 | — | — | — | 3.5 | 3.90 | — |
| | A4 | 50 | — | — | — | 29.2 | 3.30 | — |
| | A5 | 500 | — | — | — | 18.8 | 0.50 | — |
| | A6 | 850 | — | — | — | 8.9 | 4.80 | — |
| | A7 | 360 | — | — | — | 15.4 | 1.20 | 1.5 |
| | A8 | 900 | — | — | — | 28.9 | 4.10 | 24.2 |
| | A9 | 550 | — | — | — | 14.8 | 2.90 | 12.3 |
| | A10 | 500 | — | — | — | 10.7 | 1.10 | 5.3 |
| | A11 | — | 5 | 1000 | EXIST | 25.3 | 3.40 | — |
| | A12 | — | 150 | 800 | EXIST | 9.5 | 0.70 | — |
| | A13 | — | 40 | 300 | EXIST | 11.6 | 3.50 | — |
| | A14 | — | 80 | 3000 | EXIST | 21.6 | 4.30 | — |
| | A15 | — | 50 | 1200 | EXIST | 3.2 | 0.70 | — |
| | A16 | — | 30 | 700 | EXIST | 28.7 | 2.90 | — |
| | A17 | — | 40 | 1000 | EXIST | 18.2 | 0.50 | — |
| | A18 | — | 40 | 1000 | EXIST | 12.3 | 4.30 | — |
| | A19 | — | 40 | 1000 | EXIST | 7.8 | 1.60 | 5.8 |
| | A20 | — | 40 | 1000 | EXIST | 29.1 | 3.80 | 25.6 |
| | A21 | — | 40 | 1200 | EXIST | 10.4 | 1.20 | 5.3 |
| | A22 | — | 50 | 1000 | EXIST | 14.9 | 2.80 | 12.2 |
| COMPARATIVE EXAMPLES | a1 | <u>6</u> | — | — | — | 5.2 | 0.70 | — |
| | a2 | <u>1500</u> | — | — | — | 3.1 | <u>0.40</u> | 1.3 |
| | a3 | 550 | — | — | — | <u>33.8</u> | 1.00 | — |
| | a4 | 600 | — | — | — | <u>2.1</u> | 4.30 | 2.8 |
| | a5 | 550 | — | — | — | 9.8 | <u>0.40</u> | 5.8 |
| | a6 | 500 | — | — | — | 10.3 | <u>6.30</u> | 8.3 |
| | a7 | — | 2 | 350 | NONE | 29.8 | <u>5.80</u> | — |
| | a8 | — | 200 | 1000 | NONE | 8.8 | <u>10.10</u> | 4.6 |
| | a9 | — | 130 | 260 | NONE | <u>40.3</u> | <u>15.10</u> | — |
| | a10 | — | 100 | 3400 | NONE | <u>2.3</u> | <u>0.20</u> | — |
| | a11 | — | 40 | 1200 | EXIST | <u>32.3</u> | <u>8.30</u> | 15.9 |
| | a12 | — | 50 | 1000 | EXIST | <u>2.6</u> | <u>6.20</u> | — |
| | a13 | — | <u>250</u> | 1000 | NONE | 4.7 | <u>0.30</u> | 2.2 |
| | a14 | — | 150 | 800 | EXIST | 6.2 | <u>5.50</u> | 5.3 |

TABLE 3

| | | CHARACTERISTIC EVALUATIONS | | | | | | | |
| --- | --- | --- | --- | --- | --- | --- | --- | --- | --- |
| | No. | SULPHIDE STAIN RESISTANCE | WORK-ABILITY | WELD-ABILITY | FILM ADHESION | COATING-MATERIAL ADHESION PRIMARY | SECONDARY | CORROSION RESISTANCE UNDER THE LACQUER | RUST RESISTANCE |
| INVENTION EXAMPLES | A1 | VG | VG | VG | F | VG | G | G | F |
| | A2 | VG | VG | VG | VG | VG | VG | VG | VG |
| | A3 | G | VG | VG | G | G | F | G | G |
| | A4 | VG | G | G | VG | VG | VG | VG | G |
| | A5 | G | VG | VG | VG | VG | VG | VG | VG |
| | A6 | VG | VG | VG | F | VG | G | VG | G |
| | A7 | VG | VG | VG | VG | VG | VG | VG | VG |
| | A8 | VG | F | F | VG | VG | G | G | VG |
| | A9 | VG | VG | VG | VG | VG | VG | VG | VG |
| | A10 | VG | VG | VG | VG | VG | VG | VG | VG |
| | A11 | VG | G | G | VG | VG | VG | VG | VG |
| | A12 | G | VG | VG | VG | VG | VG | VG | VG |
| | A13 | VG | VG | VG | VG | VG | VG | VG | VG |
| | A14 | VG | VG | VG | VG | VG | G | VG | VG |
| | A15 | G | VG | VG | F | G | F | G | F |
| | A16 | VG | G | G | VG | VG | VG | VG | VG |
| | A17 | G | VG | VG | VG | VG | VG | VG | VG |
| | A18 | VG | VG | VG | G | VG | G | VG | VG |

TABLE 3-continued

| | | CHARACTERISTIC EVALUATIONS | | | | | | | |
|---|---|---|---|---|---|---|---|---|---|
| | | SULPHIDE STAIN | WORK- | WELD- | FILM | COATING-MATERIAL ADHESION | | CORROSION RESISTANCE UNDER THE | RUST |
| | No. | RESISTANCE | ABILITY | ABILITY | ADHESION | PRIMARY | SECONDARY | LACQUER | RESISTANCE |
| | A19 | VG | VG | VG | VG | VG | VG | VG | G |
| | A20 | VG | F | F | VG | VG | VG | F | VG |
| | A21 | VG | VG | VG | VG | VG | VG | VG | VG |
| | A22 | VG | VG | VG | VG | VG | VG | VG | VG |
| COMPARATIVE EXAMPLES | a1 | P | G | VG | P | F | P | P | P |
| | a2 | P | VG | VG | F | F | P | P | F |
| | a3 | P | P | P | F | F | P | P | F |
| | a4 | F | G | F | P | P | P | P | P |
| | a5 | P | VG | VG | P | VG | P | VG | VG |
| | a6 | F | VG | VG | P | VG | P | P | G |
| | a7 | F | F | P | P | F | P | F | P |
| | a8 | F | VG | P | P | P | P | P | P |
| | a9 | F | P | P | P | P | P | P | P |
| | a10 | P | G | P | P | P | P | P | P |
| | a11 | F | P | F | F | F | P | P | G |
| | a12 | F | G | G | P | F | P | P | P |
| | a13 | P | G | F | P | P | P | P | F |
| | a14 | F | P | VG | F | F | P | P | G |

As shown in Table 3, the invention examples A1 to A22 had evaluations of "Good" or higher in all characteristic evaluations, and thus had suitable characteristics. The comparative examples a1 to a14 had evaluations of "Poor" in one or more of characteristics, and thus had characteristics worse than those in the invention examples.

Example 3

A chemical treated steel sheets were produced by the following method. Producing conditions are shown in Tables 4 and 5.

<Ni Coated Steel Sheet>

In a case where a Ni coated layer (not composite coated layer) was formed on a steel sheet, the Ni coated layer was formed on a steel sheet having a sheet thickness of 0.15 to 0.23 mm so as to manufacture a Ni coated steel sheet using the following method of (Treatment method 1) or (Treatment method 2).

(Treatment Method 1)

After cold rolling, steel sheets which had a sheet thickness of 0.15 to 0.23 mm and were subjected to annealing and temper rolling were subjected to degreasing and pickling. Then, a Ni coated layer was formed on both surfaces thereof using a watt bath, thereby Ni coated steel sheets were produced.

(Treatment Method 2)

A Ni coated layer was formed on both surfaces of steel sheets using a watt bath, which had been subjected to cold rolling and had a sheet thickness of 0.15 to 0.23 mm. Then, annealing was performed so as to form a Ni diffusion layer. Degreasing and pickling were performed, thereby Ni coated steel sheets were produced.

<Composite Coated Steel Sheet>

(Treatment Method 1')

After cold rolling, steel sheets which had been subjected to annealing and temper rolling and had a sheet thickness of 0.15 to 0.23 mm were subjected to degreasing and pickling. Then, Fe—Ni alloy coating was performed using a sulfuric acid-hydrochloric acid. Then, Sn coating was performed using a Ferrostan bath. After that, reflow treatment was performed, and thereby composite coated steel sheets having a composite coated layer were produced.

(Treatment Method 2')

After cold rolling, Ni coating was performed on steel substrates (steel sheets), which had been subjected to annealing and temper rolling and had a sheet thickness of 0.15 to 0.23 mm, by a watt bath, and a Ni diffusion layer was formed through annealing. After degreasing and pickling, an Sn coating was performed using a Ferrostan bath. Then, reflow treatment was performed, and thereby composite coated steel sheets having composite coated layers were produced.

<Chemical Treating>

Any method of the following (Treatment method 3) to (Treatment method 7) was performed on the Ni coated steel sheets or the composite coated steel sheets produced by the method of (Treatment method 1), (Treatment method 2), (Treatment method 1'), or (Treatment method 2'), so as to form chemical treatment layers including Zr compound and Mg compound on the surfaces of the Ni coated steel sheets or the composite coated steel sheets. In Treatment methods 3 to 6, cathode electrolysis treatment was performed under conditions in which the current density was 0.5 to 30.0 A/dm$^2$, the cathode electrolysis treatment period was 0.5 to 5.0 seconds, and the temperature of a chemical treatment solution was 10° C. to 60° C. In Treatment method 7, immersing was performed in the chemical treatment solution at a temperature of 60° C. at pH of 3.5 for an immersion period of 180 seconds.

(Treatment Method 3)

Cathode electrolysis treatment was performed using a chemical treatment solution in which Zr fluoride was dissolved, and Mg nitrate was added, and thereby a chemical treatment layer was formed.

(Treatment Method 4)

Cathode electrolysis treatment was performed using a chemical treatment solution in which Zr fluoride and phosphoric acid were dissolved, and Mg nitrate was added, and thereby a chemical treatment layer was formed.

(Treatment Method 5)

Cathode electrolysis treatment was performed using a chemical treatment solution in which Zr fluoride and ammonium nitrate were dissolved, and Mg nitrate was added, and thereby a chemical treatment layer was formed.

(Treatment Method 6)

Cathode electrolysis treatment was performed using a chemical treatment solution in which Zr fluoride, phosphoric acid, and ammonium nitrate were dissolved, and Mg nitrate was added, and thereby a chemical treatment layer was formed.

(Treatment Method 7)

Immersion treatment was performed using a chemical treatment solution in which Zr fluoride was dissolved and Mg nitrate was added, and thus a chemical treatment layer was formed.

<Washing>

Preliminary-washing was performed in a manner that the chemical treatment layers were formed by the above-described treatments, and then a steel sheet were immersed into distilled water having a temperature of 10° C. or higher and lower than 40° C., for a period of 0.5 seconds to 5.0 seconds.

After the preliminary-washing had been performed, main-washing was performed by immersing the steel sheets into distilled water having a temperature shown in Table 5, for a period shown in Table 5.

<Measurement of Adhered Amount>

The amount of Ni metal and the amount of Sn metal in the coated layer was measured by a fluorescent X-ray method. The amount of Zr, the amount of Mg, and the amount of phosphoric acid or phosphate (in terms of P) of the chemical treatment layer were measured by a quantitative analysis method such as fluorescent X-ray analysis.

Measurement results are shown in Table 6.

<Performance Evaluation>

Regarding the items of (A) to (H) exemplified in Example 2, and an item of (I) described as follows, performance evaluations were performed on the test materials subjected to the above-described treatments. Evaluation results are shown in Table 7.

(I) Zr Adhering Acceleration Effect by Addition of Mg Ions

Steel sheets for a container (referred to as a Mg not-containing steel sheets for a container below) were produced using chemical treatment solution obtained by removing Mg ions from the chemical treatment solution which had been used when each of the test materials were produced. The producing was performed under conditions similar to those for each of the test materials except for the used chemical treatment solution. Then, the amount of Zr in the Mg not-containing steel sheets for a container was measured.

A Zr adhering acceleration effect by addition of Mg ions was evaluated based on a ratio (referred to as a Zr adhering acceleration ratio) obtained by dividing the amount of Zr in each of the test materials by the amount of Zr in the Mg not-containing steel sheet for a container. Specifically, a case where the Zr adhering acceleration ratio was equal to or more than 1.3 was evaluated as "Very Good". A case where the Zr adhering acceleration ratio was less than 1.3 and 1.2 or more was evaluated as "Good". A case where the Zr adhering acceleration ratio was less than 1.2 and 1.1 or more was evaluated as "Fair". A case where the Zr adhering acceleration ratio was less than 1.1 was evaluated as "Poor".

TABLE 4

|  |  |  | COATING | | | |
|---|---|---|---|---|---|---|
|  |  |  | Ni COATED LAYER | COMPOSITE COATED LAYER | | |
|  |  | No. | TREATMENT METHOD | AMOUNT OF Ni METAL (mg/m$^2$) | AMOUNT OF Ni METAL (mg/m$^2$) | AMOUNT OF Sn METAL (mg/m$^2$) | EXISTENCE STATE OF ISLAND-SHAPED Sn |
| INVENTION EXAMPLES | B1 | 1 | 12 | — | — | — |
|  | B2 | 1 | 980 | — | — | — |
|  | B3 | 1 | 500 | — | — | — |
|  | B4 | 1 | 800 | — | — | — |
|  | B5 | 1 | 550 | — | — | — |
|  | B6 | 1 | 100 | — | — | — |
|  | B7 | 1 | 500 | — | — | — |
|  | B8 | 1 | 500 | — | — | — |
|  | B9 | 1 | 50 | — | — | — |
|  | B10 | 2 | 500 | — | — | — |
|  | B11 | 2 | 550 | — | — | — |
|  | B12 | 2 | 600 | — | — | — |
|  | B13 | 2 | 500 | — | — | — |
|  | B14 | 1' | — | 7 | 500 | EXIST |
|  | B15 | 1' | — | 150 | 700 | EXIST |
|  | B16 | 1' | — | 100 | 1200 | EXIST |
|  | B17 | 1' | — | 40 | 1000 | EXIST |
|  | B18 | 1' | — | 50 | 300 | EXIST |
|  | B19 | 1' | — | 120 | 2000 | EXIST |
|  | B20 | 1' | — | 20 | 3000 | EXIST |
|  | B21 | 1' | — | 40 | 1000 | EXIST |
|  | B22 | 1' | — | 60 | 1000 | EXIST |
|  | B23 | 2' | — | 80 | 1500 | EXIST |
|  | B24 | 2' | — | 40 | 1000 | EXIST |
|  | B25 | 2' | — | 40 | 1000 | EXIST |
|  | B26 | 2' | — | 40 | 1000 | EXIST |
| COMPARATIVE EXAMPLES | b1 | 1 | 8 | — | — | — |
|  | b2 | 1 | 500 | — | — | — |
|  | b3 | 1 | 500 | — | — | — |
|  | b4 | 1 | 550 | — | — | — |
|  | b5 | 1 | 1200 | — | — | — |

TABLE 4-continued

| | | COATING | | | |
| | | Ni COATED LAYER | COMPOSITE COATED LAYER | | |
| No. | TREATMENT METHOD | AMOUNT OF Ni METAL (mg/m$^2$) | AMOUNT OF Ni METAL (mg/m$^2$) | AMOUNT OF Sn METAL (mg/m$^2$) | EXISTENCE STATE OF ISLAND-SHAPED Sn |
| --- | --- | --- | --- | --- | --- |
| b6 | 1 | 600 | — | — | — |
| b7 | 2 | 550 | — | — | — |
| b8 | 2 | 550 | — | — | — |
| b9 | 1' | — | 2 | 1000 | NONE |
| b10 | 1' | — | 4 | 280 | NONE |
| b11 | 1' | — | 40 | 1000 | EXIST |
| b12 | 1' | — | 40 | 1000 | EXIST |
| b13 | 1' | — | 40 | 1000 | EXIST |
| b14 | 1' | — | 40 | 1000 | EXIST |
| b15 | 2' | — | 40 | 1000 | EXIST |
| b16 | 2' | — | 40 | 1000 | EXIST |

TABLE 5

| | | CHEMICAL TREATING | | | | | | WATER WASHING TREATMENT | |
| | | CHEMICAL TREATMENT BATH | | | | | | | |
| | No. | TREATMENT METHOD | Zr ION (ppm) | F ION (ppm) | Mg ION (ppm) | PHOSPHATE ION (ppm) | NITRATE ION (ppm) | AMMONIUM ION (ppm) | TEMP. (° C.) | TIME (sec) |
| --- | --- | --- | --- | --- | --- | --- | --- | --- | --- | --- |
| INVENTION EXAMPLES | B1 | 3 | 120 | 150 | 80 | — | — | — | 40 | 0.5 |
| | B2 | 3 | 3000 | 3800 | 150 | — | — | — | 70 | 2 |
| | B3 | 3 | 100 | 120 | 60 | — | — | — | 40 | 0.5 |
| | B4 | 3 | 3000 | 3900 | 100 | — | — | — | 90 | 3 |
| | B5 | 3 | 1400 | 1800 | 50 | — | — | — | 40 | 3 |
| | B6 | 3 | 1400 | 1800 | 300 | — | — | — | 90 | 2 |
| | B7 | 4 | 2500 | 3300 | 100 | 1800 | — | — | 40 | 3 |
| | B8 | 4 | 1400 | 1800 | 250 | 900 | — | — | 80 | 0.5 |
| | B9 | 5 | 700 | 900 | 100 | 2000 | 1500 | 1200 | 60 | 1 |
| | B10 | 5 | 1400 | 1800 | 150 | 900 | 2000 | 1550 | 90 | 1 |
| | B11 | 5 | 1400 | 1800 | 70 | 900 | 3000 | 2000 | 90 | 1 |
| | B12 | 5 | 1400 | 1800 | 300 | 900 | 1500 | 1200 | 70 | 2 |
| | B13 | 5 | 1400 | 1800 | 150 | 900 | 1500 | 1200 | 90 | 1 |
| | B14 | 3 | 120 | 150 | 60 | — | — | — | 40 | 0.5 |
| | B15 | 3 | 3000 | 3800 | 150 | — | — | — | 70 | 2 |
| | B16 | 3 | 100 | 120 | 80 | — | — | — | 40 | 0.5 |
| | B17 | 3 | 3000 | 3900 | 100 | — | — | — | 90 | 3 |
| | B18 | 3 | 1400 | 1800 | 50 | — | — | — | 40 | 3 |
| | B19 | 3 | 1400 | 1800 | 300 | — | — | — | 90 | 2 |
| | B20 | 4 | 2500 | 3300 | 100 | 1800 | — | — | 40 | 3 |
| | B21 | 4 | 1400 | 1800 | 250 | 900 | — | — | 80 | 0.5 |
| | B22 | 5 | 700 | 900 | 100 | 2000 | 1500 | 1200 | 60 | 1 |
| | B23 | 5 | 1400 | 1800 | 150 | 900 | 2000 | 1550 | 90 | 1 |
| | B24 | 5 | 1400 | 1800 | 70 | 900 | 3000 | 2000 | 90 | 1 |
| | B25 | 5 | 1400 | 1800 | 300 | 900 | 1500 | 1200 | 70 | 2 |
| | B26 | 5 | 1400 | 1800 | 150 | 900 | 1500 | 1200 | 90 | 1 |
| COMPARATIVE EXAMPLES | b1 | 3 | 80 | 130 | 80 | — | — | — | 70 | 1 |
| | b2 | 3 | 3200 | 4100 | 200 | — | — | — | 90 | 3 |
| | b3 | 3 | 60 | 80 | 150 | — | — | — | 70 | 3 |
| | b4 | 3 | 3300 | 4200 | 200 | — | — | — | 90 | 3 |
| | b5 | 4 | 1400 | 1800 | 40 | 900 | — | — | 90 | 1 |
| | b6 | 4 | 1400 | 800 | 320 | 900 | — | — | 90 | 0.5 |
| | b7 | 5 | 1400 | 800 | 300 | 900 | 1500 | 1200 | 20 | 0.5 |
| | b8 | 5 | 2800 | 1600 | 200 | 1800 | 3000 | 2000 | 40 | 0.2 |
| | b9 | 3 | 80 | 130 | 80 | — | — | — | 70 | 1 |
| | b10 | 3 | 3200 | 4100 | 200 | — | — | — | 90 | 3 |
| | b11 | 3 | 60 | 80 | 150 | — | — | — | 70 | 3 |
| | b12 | 3 | 3300 | 4200 | 200 | — | — | — | 90 | 3 |
| | b13 | 4 | 1400 | 1800 | 40 | 900 | — | — | 90 | 1 |
| | b14 | 4 | 1400 | 800 | 320 | 900 | — | — | 90 | 0.5 |
| | b15 | 5 | 1400 | 800 | 300 | 900 | 1500 | 1200 | 20 | 0.5 |
| | b16 | 5 | 2800 | 1600 | 200 | 1800 | 3000 | 2000 | 40 | 0.2 |

TABLE 6

| | No. | CHEMICAL TREATMENT LAYER | | |
|---|---|---|---|---|
| | | AMOUNT OF Zr METAL (mg/m$^2$) | AMOUNT OF Mg METAL (mg/m$^2$) | AMOUNT OF P (mg/m$^2$) |
| INVENTION EXAMPLES | B1 | 12.8 | 2.80 | — |
| | B2 | 27.5 | 4.80 | — |
| | B3 | 3.2 | 0.50 | — |
| | B4 | 29.4 | 4.50 | — |
| | B5 | 19.6 | 3.70 | — |
| | B6 | 21.5 | 4.60 | — |
| | B7 | 27.3 | 4.80 | 19.5 |
| | B8 | 14.8 | 1.10 | 9.9 |
| | B9 | 9.8 | 1.80 | 6.2 |
| | B10 | 26.2 | 2.20 | 23.8 |
| | B11 | 6.5 | 3.20 | 3.4 |
| | B12 | 14.8 | 2.80 | 7.9 |
| | B13 | 10.2 | 2.10 | 5.7 |
| | B14 | 3.1 | 0.50 | — |
| | B15 | 21.1 | 4.60 | — |
| | B16 | 3.7 | 1.40 | — |
| | B17 | 25.1 | 3.80 | — |
| | B18 | 14.9 | 2.30 | — |
| | B19 | 16.3 | 3.80 | — |
| | B20 | 18.8 | 1.10 | — |
| | B21 | 12.1 | 0.90 | — |
| | B22 | 7.1 | 3.30 | 6.3 |
| | B23 | 26.9 | 4.20 | 19.2 |
| | B24 | 7.7 | 0.90 | 4.8 |
| | B25 | 13.2 | 2.40 | 6.1 |
| | B26 | 10.1 | 1.80 | 5.1 |
| COMPARATIVE EXAMPLES | B1 | 2.3 | 0.10 | — |
| | B2 | 32.3 | 11.20 | — |
| | B3 | 1.3 | 0.10 | — |
| | B4 | 45.8 | 13.20 | — |
| | B5 | 2.8 | ≤0.10 | 1.8 |
| | B6 | 32.3 | 8.30 | 16.9 |
| | B7 | 28.5 | 8.90 | 19.4 |
| | B8 | 35.1 | 10.50 | 20.3 |
| | B9 | 1.1 | 0.20 | — |
| | B10 | 32.1 | 15.70 | — |
| | B11 | 0.9 | 0.20 | — |
| | B12 | 33.3 | 18.80 | — |
| | B13 | 1.9 | 0.10 | — |
| | B14 | 26.6 | 6.20 | 14.5 |
| | B15 | 20.8 | 5.50 | 12.1 |
| | B16 | 32.2 | 8.20 | 16.9 |

TABLE 7

| | No. | CHARACTERISTIC EVALUATIONS | | | | | | | | |
|---|---|---|---|---|---|---|---|---|---|---|
| | | ACCELERATION EFFECT OF Mg ADDITION | SULPHIDE STAIN RESISTANCE | WORKABILITY | WELDABILITY | FILM ADHESION | LACQUER ADHESION | | CORROSION RESISTANCE UNDER THE LACQUER | RUST RESISTANCE |
| | | | | | | | PRIMARY | SECONDARY | | |
| INVENTION EXAMPLES | B1 | VG | VG | VG | VG | VG | VG | VG | VG | VG |
| | B2 | VG | VG | VG | G | VG | VG | VG | VG | VG |
| | B3 | G | G | VG | VG | G | G | G | G | G |
| | B4 | VG | VG | G | G | VG | VG | VG | VG | VG |
| | B5 | G | VG | VG | VG | VG | VG | VG | VG | VG |
| | B6 | VG | VG | VG | G | VG | VG | VG | VG | VG |
| | B7 | VG | VG | VG | VG | VG | VG | VG | VG | VG |
| | B8 | VG | VG | VG | VG | VG | VG | VG | VG | VG |
| | B9 | VG | VG | VG | VG | VG | VG | VG | VG | VG |
| | B10 | VG | VG | G | G | VG | VG | VG | VG | VG |
| | B11 | VG | VG | VG | VG | VG | VG | VG | VG | VG |
| | B12 | VG | VG | VG | VG | VG | VG | VG | VG | VG |
| | B13 | VG | VG | VG | VG | VG | VG | VG | VG | VG |
| | B14 | G | G | VG | VG | G | G | G | G | G |
| | B15 | VG | VG | VG | VG | VG | VG | VG | VG | VG |
| | B16 | G | G | VG | VG | VG | VG | VG | VG | VG |
| | B17 | VG | VG | VG | VG | VG | VG | VG | VG | VG |
| | B18 | VG | VG | VG | VG | VG | VG | VG | VG | VG |
| | B19 | VG | VG | VG | VG | VG | VG | VG | VG | VG |
| | B20 | VG | VG | VG | VG | VG | VG | VG | VG | VG |
| | B21 | VG | G | VG | VG | VG | VG | VG | VG | VG |
| | B22 | VG | VG | VG | VG | VG | VG | VG | VG | VG |
| | B23 | VG | VG | G | G | VG | VG | VG | VG | VG |
| | B24 | VG | G | VG | VG | VG | VG | VG | VG | VG |
| | B25 | VG | VG | VG | VG | VG | VG | VG | VG | VG |
| | B26 | VG | VG | VG | VG | VG | VG | VG | VG | VG |
| COMPARATIVE EXAMPLES | b1 | P | P | F | P | P | P | P | P | P |
| | b2 | G (irregularity) | F | P | P | F | P | P | P | P |
| | b3 | P | P | F | P | P | P | P | P | P |
| | b4 | G (irregularity) | F | P | P | P | P | P | P | P |
| | b5 | P | P | F | P | P | P | P | P | P |
| | b6 | G (irregularity) | P | P | P | P | P | P | P | P |
| | b7 | VG | F | F | P | P | P | P | P | P |
| | b8 | VG | F | P | P | P | P | P | P | F |
| | b9 | P | P | F | P | F | P | P | P | P |
| | b10 | G (irregularity) | F | P | P | F | P | P | P | P |

TABLE 7-continued

CHARACTERISTIC EVALUATIONS

| No. | ACCELERATION EFFECT OF Mg ADDITION | SULPHIDE STAIN RESISTANCE | WORKABILITY | WELDABILITY | FILM ADHESION | LACQUER ADHESION PRIMARY | LACQUER ADHESION SECONDARY | CORROSION RESISTANCE UNDER THE LACQUER | RUST RESISTANCE |
|---|---|---|---|---|---|---|---|---|---|
| b11 | P | P | F | P | P | P | P | P | P |
| b12 | G (irregularity) | F | P | P | P | P | P | P | P |
| b13 | P | P | F | P | P | P | P | P | P |
| b14 | G (irregularity) | F | P | P | P | P | P | P | P |
| b15 | G (irregularity) | F | F | P | P | P | P | P | F |
| b16 | G (irregularity) | F | P | P | P | P | P | P | F |

In all of the invention example B1 to B26, the Zr adhering acceleration effect by addition of Mg ions was provided, and sulphide stain resistance, workability, weldability, film adhesion, primary lacquer adhesion, secondary lacquer adhesion, corrosion under the lacquer, and corrosion resistance were excellent.

Further, the chemical treatment layer contains phosphoric acid or phosphate of 1.5 mg/m² or more as the amount of P, and thus the film adhesion (including workability) and the corrosion under the lacquer are further improved.

In the comparative examples b1 to b16, the Zr adhering acceleration effect was not provided, and at least some characteristics of the sulphide stain resistance, workability, weldability, film adhesion, primary lacquer adhesion, secondary lacquer adhesion, corrosion under the lacquer, and corrosion resistance were bad.

In the comparative examples b1 to b9, it is considered that the amount of Zr ions in the chemical treatment solution is small, and thus exhibiting the Zr precipitation acceleration effect by addition of Mg ions is not allowed.

In the comparative examples b3 and b11, the amount of F ions in the chemical treatment solution was small, and thus, it was not possible that $Zr^{4+}$ ions were stably provided in a state of being dissolved in the treatment solution in a form of complex ions such as $(ZrF_6)^{2-}$, the $Zr^{4+}$ ions were precipitated as an insoluble matter in the treatment solution in a form of $ZrO_2$, and the amount of the Zr compound in the chemical treatment layer was small even if Mg ions were contained. Thus, it is considered that the Zr precipitation acceleration effect by addition of Mg ions is not suitable. (Reversely, in a case where the large amount of F ions is contained, complex ions such as $(ZrF_6)^{2-}$ are excessively stabilized, and thus film formation is difficult.)

In the comparative examples b5 to b13, it is considered that the amount of the Mg ions in the chemical treatment solution is insufficiently, and thus the Zr precipitation acceleration effect by the Mg ions is not suitable.

Hitherto, the preferred embodiment of the present invention is described in detail with reference to the accompanying drawings. However, the present invention is not limited to the above-described examples. It is obvious that those skilled in the art to which the present invention belongs can make various changes or modifications within the scope of the technical idea described in the claims. It is understood that these are obviously also within the technical scope of the present invention.

INDUSTRIAL APPLICABILITY

According to the embodiment, it is possible to provide a steel sheet for a container and a method for producing the steel sheet for a container, which has excellent productivity, environmental properties, and sulphide stain resistance.

BRIEF DESCRIPTION OF THE REFERENCE SYMBOLS

10 STEEL SHEET FOR A CONTAINER
101 STEEL SHEET
102 Ni COATED LAYER
103 COMPOSITE COATED LAYER
103d Fe—Ni—Sn ALLOY LAYER
103e ISLAND-SHAPED Sn COATED LAYER
105 CHEMICAL TREATMENT LAYER

What is claimed is:

1. A steel sheet for a container, comprising:
   a steel sheet;
   a coated layer which contains Ni and is provided as an upper layer of the steel sheet; and
   a chemical treatment layer which is provided as an upper layer of the coated layer, and consists of
   (a) a Zr compound in an amount of 3.0 to 30.0 mg/m² in terms of Zr metal,
   (b) a Mg compound in an amount of 0.50 to 5.00 mg/m² in terms of Mg metal, and
   (c) unavoidable impurities, and optionally
   (d) one or more selected from the group consisting of phosphoric acid and phosphate in a total amount of 1.5 to 25.0 mg/m² in terms of P,
   wherein the coated layer is one of the group consisting of
   a Ni coated layer which contains Ni in amount of 10 to 1000 mg/m² in terms of Ni metal, and
   a composite coated layer which contains Ni in an amount of 5 to 150 mg/m² in terms of Ni metal and Sn in an amount of 300 to 3000 mg/m² in terms of Sn metal, and has an island-shaped Sn coated layer formed on an Fe—Ni—Sn alloy layer.

2. A method for producing a steel sheet for a container, the method comprising:
   coating so as to form a coated layer which is one of the group consisting of
   a Ni coated layer which contains Ni in amount of 10 to 1000 mg/m² in terms of Ni metal, and
   a composite coated layer which contains Ni in an amount of 5 to 150 mg/m² in terms of Ni metal and Sn in an amount of 300 to 3000 mg/m² in terms of Sn metal, and has an island-shaped Sn coated layer and an Fe—Ni—Sn alloy layer formed on the island-shaped Sn coated layer, on a steel sheet;

after the coating, chemical treating so as to form a chemical treatment layer on the coated layer by cathode electrolysis treatment using a chemical treatment solution containing 100 to 3000 ppm of Zr ions, 120 to 4000 ppm of F ions, and 50 to 300 ppm of Mg ions; and after the chemical treating, main-washing the steel sheet on which the coated layer and the chemical treatment layer are formed, using water at a temperature of 40° C. or higher for 0.5 seconds or longer.

3. The method for producing a steel sheet for a container according to claim 2, wherein the chemical treatment solution further includes 2000 ppm or less of phosphate ions.

4. The method for producing a steel sheet for a container according to claim 3, wherein the chemical treatment solution further includes nitrate ions and ammonium ions having a total amount of 20000 ppm or less.

5. The method for producing a steel sheet for a container according to claim 4, further comprising:

before the main-washing, preliminary-washing the steel sheet on which the coated layer and the chemical treatment layer are formed, using water at a temperature of 10° C. or more and lower than 40° C. for 0.5 seconds or longer.

6. The method for producing a steel sheet for a container according to claim 3, further comprising:

before the main-washing, preliminary-washing the steel sheet on which the coated layer and the chemical treatment layer are formed, using water at a temperature of 10° C. or more and lower than 40° C. for 0.5 seconds or longer.

7. The method for producing a steel sheet for a container according to claim 2, wherein the chemical treatment solution further includes nitrate ions and ammonium ions having a total amount of 20000 ppm or less.

8. The method for producing a steel sheet for a container according to claim 7, further comprising:

before the main-washing, preliminary-washing the steel sheet on which the coated layer and the chemical treatment layer are formed, using water at a temperature of 10° C. or more and lower than 40° C. for 0.5 seconds or longer.

9. The method for producing a steel sheet for a container according to claim 2, further comprising:

before the main-washing, preliminary-washing the steel sheet on which the coated layer and the chemical treatment layer are formed, using water at a temperature of 10° C. or more and lower than 40° C. for 0.5 seconds or longer.

* * * * *